No. 869,204. PATENTED OCT. 22, 1907.
R. D. WEBB.
AUTOMATIC WEIGHING MACHINE.
APPLICATION FILED APR. 8, 1907.

2 SHEETS—SHEET 1.

No. 869,204.　　　　　　　　　　　　　　　PATENTED OCT. 22, 1907.
R. D. WEBB.
AUTOMATIC WEIGHING MACHINE.
APPLICATION FILED APR. 8, 1907.

2 SHEETS—SHEET 2.

Witnesses
Inventor
Robert D. Webb
By Foster Freeman & Watson
Attorneys

UNITED STATES PATENT OFFICE.

ROBERT D. WEBB, OF MINDEN, LOUISIANA.

AUTOMATIC WEIGHING-MACHINE.

No. 869,204.  Specification of Letters Patent.  Patented Oct. 22, 1907.

Application filed April 8, 1907. Serial No. 367,090.

*To all whom it may concern:*

Be it known that I, ROBERT D. WEBB, a citizen of the United States, and a resident of Minden, Webster parish, Louisiana, have invented certain new and useful Improvements in Automatic Weighing-Machines, of which the following is a specification.

This invention comprises improvements in automatic weighing and dumping machines wherein a pair of receptacles, attached to a pair of scale beams, are automatically and alternately filled with a given weight of grain or other material and dumped, and the purpose of the invention is to provide in such a machine means whereby the scale beam which is in weighing position will be free to move for a given initial distance from said position without being retarded or interfered with by any other part of the mechanism, so that the scale will weigh accurately. After moving said initial distance from its weighing position the rising scale beam releases the other beam of the machine which then aids in the operation of the mechanism.

Figure 1:
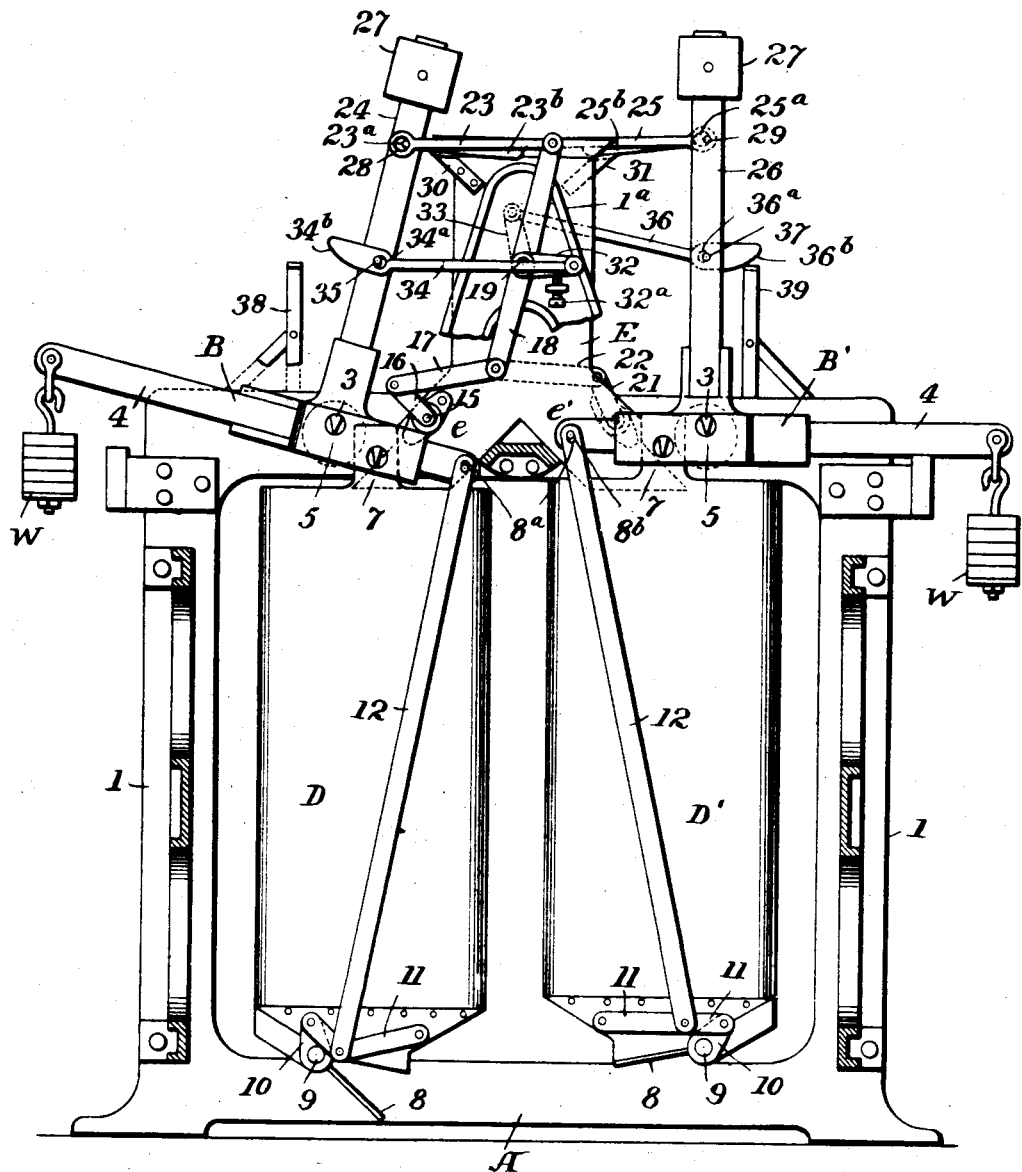
Figure 2:
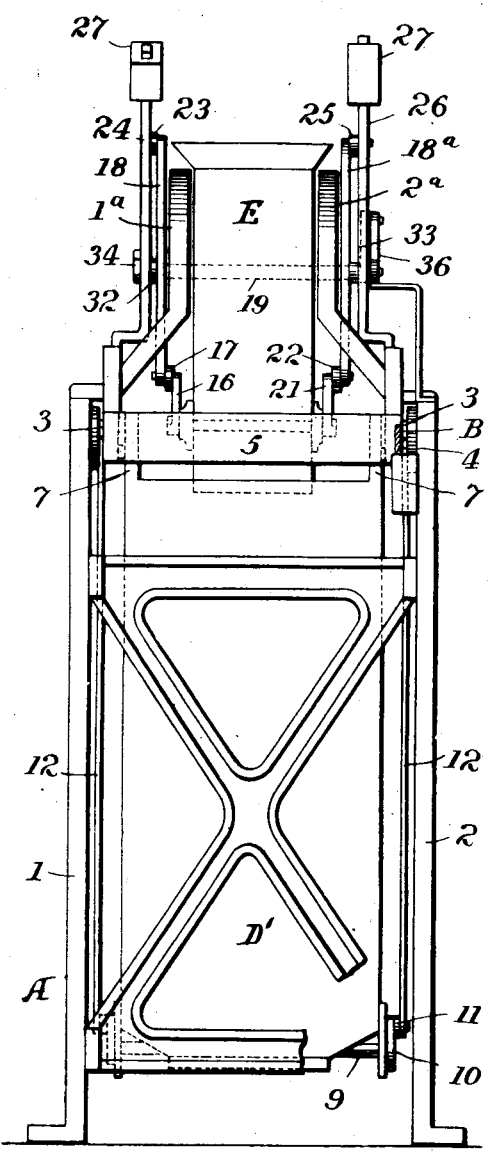
Figure 3:
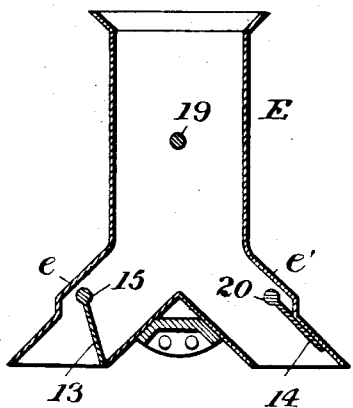
Figure 4:
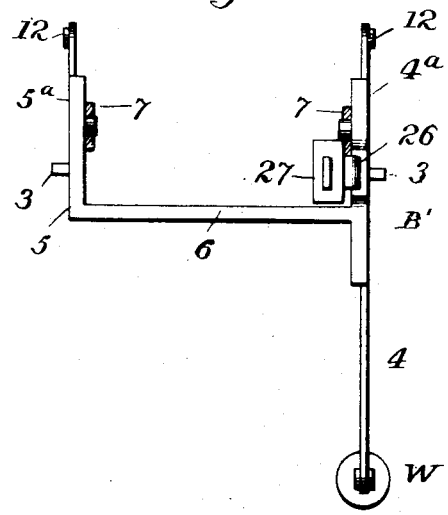

In the accompanying drawing Figure 1 is a side elevation of the machine, the supporting frame being shown in central vertical section; Fig. 2 is an end elevation of the machine; Fig. 3 is a central vertical section through the feed hopper, and Fig. 4 is a top plan view of one of the scale beams.

Referring to the drawing, A indicates a suitable frame in the upper part of which, between the sides 1 and 2, are mounted scale beams B and B'. A feed chute E is arranged centrally in the upper part of the frame, and the scale beams are pivoted at opposite sides of the chute upon knife-edge bearings 3, which fit into suitable cups in the sides of the frame. The scale beams are alike in construction, each beam, as shown best in Fig. 4, comprising parallel bars 4 and 5, connected by a cross-piece 6, said bars being provided with knife-edge bearings 3 for supporting the beam, and the longer arm 4 carrying adjustable weights $w$. Receptacles D and D' are suspended from the shorter arms of the beams B and B' respectively, said receptacles having ears 7 which are pivotally connected to the beams near the pivotal points or bearings of the beams. Each receptacle has a gate or valve 8 at its lower end which is mounted upon a rock-shaft 9 having cranks 10 at the sides of the receptacle connected to toggle-levers 11. Links 12 connect the ends of the shorter arms of the scale beam with the toggle-levers as shown, the arrangement being such that when the scale beam is in horizontal position the toggle levers connected thereto will be straightened and the valve or gate will be closed, and when the scale beam is tilted the toggle levers will be flexed and the valve or gate opened.

The rods 12 have slots $8^a$ at their upper ends through which pins $8^b$ on the beams extend, thus allowing for lost motion between the rods and beams, so that during the initial movement of a beam from its horizontal position it will not be obstructed or retarded by pressure against the rods.

The feed chute E has branch chutes $e$ and $e'$ extending over the upper ends of the receptacles D and D' respectively, and valves or gates 13 and 14 are arranged within the branch chutes $e$ and $e'$ respectively. The valve 13 is mounted on a rock-shaft 15 which is provided with a crank 16, and said crank is connected by a link 17 to one end of a lever 18, which is journaled at its center upon the rock-shaft 19, the latter being journaled in upward extensions $1^a$ and $2^a$ of the frame and extending through the feed hopper. The valve 14 is secured to the rock shaft 20 having a crank 21 which is connected by a link 22 to the lever $18^a$ arranged parallel with the lever 18 upon the opposite side of the hopper, and journaled upon the rock-shaft 19. When the levers 18 and $18^a$ are rocked in one direction, it will be evident that, through the connections described, the valves 13 and 14 will be moved, one into closed position and the other into open position, and when the levers are rocked in the opposite direction the positions of the valves will be reversed, so that, according to the positions of the valves, the material to be weighed will be directed into one or the other of the receptacles.

The upper end of the lever 18 is connected by a link 23 to a standard 24 which projects upwardly from the scale beam B, being secured to said beam above its pivotal point, and the upper end of the lever $18^a$ is connected by a link 25 to a standard 26 which is connected to the beam B' above the pivotal point of the latter. Each standard has a weight 27 at its upper end. The links 23 and 25 are connected to the standards by means permitting a limited amount of play or lost motion between the standards and the links. Thus, the link 23 has a slot $23^a$ through which a pin 28 on the standard extends and the link 25, as shown in dotted lines in Fig. 1, has a similar slot $25^a$ engaged by a pin 29 upon the standard 26. The link 23 also has a cam-surface $23^b$ on its under side, which when the standard 24 moves to vertical position, rides onto a fixed support 30, thus raising the slotted end of the lever 23 slightly and taking the weight of said lever off of the pin 28 on the scale beam. Similarly, the link 25 has a cam-surface $25^b$ on its lower side which rides on to a fixed support 31 when the standard 26 moves from the inclined to the vertical position, thus taking the weight of the link off of the pin 29. When a scale beam is in the horizontal

cranks with the standards, and means for supporting said links out of engagement with the standards when the weights are poised.

8. In an automatic weighing machine, two scale beams having weighted standards projecting above the beams, receptacles connected to said beams, valve mechanism for directing the material to be weighed into said receptacles alternately, a lever for operating said mechanism, links connecting said lever with the standards, cranks arranged at an angle to one another, links connected to the cranks and having slot and pin connections with the standards, and means for supporting said links out of engagement with the standards when the latter are poised.

9. In an automatic weighing machine, two scale beams having weighted standards projecting above the beams, receptacles connected to said beams, valve mechanism for directing the material to be weighed into said receptacles alternately, a lever for operating said mechanism, links connecting said lever with the standards, cranks arranged at an angle to one another, links loosely connecting said cranks with the standards, and fixed supports arranged to hold said links out of frictional engagement with the standards when the latter are poised.

10. In an automatic weighing machine, two independently movable scale beams having weighted standards projecting above the beams, receptacles connected to said scale beams, valve mechanism for directing the material to be weighed into said receptacles alternately, levers connected to said valve mechanism, links connected to the levers and having lost-motion connections with said standards, means for supporting said links out of frictional engagement with said standards when the latter are poised, cranks arranged at an angle to one another, links connected to said cranks and having lost-motion connections with said standards, and means for supporting said latter links out of frictional engagement with said standards when the standards are poised.

11. In an automatic weighing machine, the combination with pivoted scale beams having weighted standards above the beams, receptacles connected to the beams, and valve mechanism operatively connected to the standards, of cranks arranged at an angle to one another, links connected to said cranks and having lost motion connections with said standards, and means for supporting the links out of frictional engagement with the standards when the latter are poised.

12. In an automatic weighing machine, the combination with pivoted scale beams having weighted standards above the beams, receptacles connected to the beams, and valve mechanism operatively connected to the standards, of cranks arranged at an angle to one another, links connected to said cranks and having lost motion connections with said standards, said links having cam surfaces and supports arranged to be engaged by said surfaces when the standards move to poised position.

13. In an automatic weighing machine, a scale beam having a weighted standard projecting above the beam, a receptacle connected to the beam, valve mechanism for controlling the admission of material to said receptacle, a lever for operating said mechanism, a link connected to said lever and having a lost motion connection with said standard, said link having a cam surface, and a support arranged to be engaged by said surface when the standard moves to poised position.

14. In an automatic weighing machine, two scale beams each having a weighted standard projecting above the beam, receptacles connected to the beams, valve mechanism for controlling the admission of material to said receptacles, levers for operating said mechanism, links connected to said levers and having lost motion connections with said standards, said links having cam surfaces, and supports arranged to be engaged by said surfaces when the standards move to poised positions.

15. An automatic weighing machine comprising two scale beams, receptacles connected to said beams, valve mechanism for controlling the admission of material to said receptacles, connections between said beams and valve mechanism whereby the descending beam aids in operating the valves, and means for holding said connections out of engagement with the beams when the latter are in weighing position.

16. An automatic weighing machine comprising two scale beams, receptacles connected to said beams, connections between said beams whereby the ascending beam releases the opposing beam and is locked in inclined position, and means for holding said connections out of engagement with the beams when the latter are in weighing position.

17. In an automatic weighing machine, scale beams, receptacles connected to said scale beams, connections between the said beams whereby the ascending beam releases the descending beam and is locked out of weighing position, and means for alternately holding said connections out of engagement with the beams until the latter have respectively moved from their original weighing position.

18. In an automatic weighing machine, scale beams, receptacles connected to the scale beams, valves for controlling the admission of material to said receptacles, connections between said beams and the valve mechanism for operating the valves, and means for holding said connections out of engagement with the beams while the latter are in weighing position.

19. In an automatic weighing machine, scale beams, receptacles connected to the scale beams, valves for controlling the admission of material to said receptacles, mechanism between said beams and valves for operating the latter, and means for holding said mechanism out of engagement with the beams until the latter have moved from their original weighing positions.

20. In an automatic weighing machine, a scale beam, a receptacle connected to the scale beam, a valve for controlling the admission of material to said receptacle, mechanism between said beam and valve for operating the latter, and means for holding said mechanism out of engagement with the beam until the latter has moved from its original weighing position.

21. In an automatic weighing machine, scale beams, receptacles connected with said beams, valves for controlling the admission of the material to said receptacles, mechanism for operating the valves, standards for operating the said mechanism, and means for holding said mechanism out of engagement with the standards while the beams are in weighing position.

22. In an automatic weighing machine, scale beams having standards projecting from the same, receptacles connected to said beams, valves for controlling the admission of material to said receptacles, mechanism for operating said valves, and means for supporting said mechanism out of engagement with the standards when their respective beams are in weighing position.

23. In an automatic weighing machine, the scale beam having a standard projecting from same, a receptacle connected to said beam, a valve for controlling the admission of material to said receptacle, mechanism for operating said valve, and means for supporting said mechanism out of engagement with the standard when the beam is in weighing position.

24. In an automatic weighing machine, scale beams having standards projecting from the same, receptacles connected to said beams, valves for controlling the admission of material to the receptacles, mechanism for operating said valves, including cranks arranged at an angle to one another and mechanism for turning the same loosely connected to said standards, and means for holding said mechanism out of frictional engagement with the standards while the respective beams are in weighing position.

25. In an automatic weighing machine, scale beams having standards projecting therefrom, receptacles connected to the scale beams, connections between said standards whereby the standard connected to the ascending scale beam releases the other standard and is locked out of weighing position, and means for alternately holding said connections out of engagement with the standards until the latter have respectively moved out of their original weighing positions.

26. In an automatic weighing machine, scale beams with standards projecting therefrom, receptacles connected to said beams, mechanism loosely connecting said standards whereby each standard is alternately locked in fixed position, and means for alternately holding said mechanism out of engagement with the respective standards while same are in original weighing positions.

27. In an automatic weighing machine, scale beams with standards projecting therefrom, and mechanism loosely connecting said standards whereby each standard is alternately locked in fixed position as the receptacles connected with the scale beams are alternately filled.

28. In an automatic weighing machine, scale beams with weighted standards projecting therefrom, receptacles connected to said beams, mechanism loosely connecting said standards whereby each standard is alternately locked in fixed position, and means for alternately holding said mechanism out of engagement with the respective standards while same are in original position.

29. In an automatic weighing machine, scale beams with weighted standards projecting therefrom, and mechanism loosely connecting said standards whereby each standard is alternately locked in fixed position as the receptacles connected with the scale beams are alternately filled.

In testimony whereof I affix my signature in presence of two witnesses.

ROBT. D. WEBB.

Witnesses:
PIERCE CREWS,
N. R. GRIGSBY.